US007211705B2

(12) United States Patent
Bergbreiter et al.

(10) Patent No.: US 7,211,705 B2
(45) Date of Patent: May 1, 2007

(54) PHASE SELECTIVE POLYMER SUPPORTS FOR CATALYSIS

(75) Inventors: David E. Bergbreiter, College Station, TX (US); Chunmei Li, San Diego, CA (US); Jacqueline O. Besinaiz, Bryan, TX (US); Jun Li, College Station, TX (US); Shayna D. Sung, Bryan, TX (US)

(73) Assignee: The Texas A&M University System, College Station, TX (US)

( * ) Notice: Subject to any disclaimer, the term of this patent is extended or adjusted under 35 U.S.C. 154(b) by 465 days.

(21) Appl. No.: 10/656,566

(22) Filed: Sep. 5, 2003

(65) Prior Publication Data

US 2004/0082463 A1 Apr. 29, 2004

Related U.S. Application Data

(60) Provisional application No. 60/408,586, filed on Sep. 6, 2002.

(51) Int. Cl.
| | | |
|---|---|---|
| C07C 1/20 | (2006.01) | |
| C07C 45/00 | (2006.01) | |
| C07C 255/00 | (2006.01) | |
| C07F 9/02 | (2006.01) | |

(52) U.S. Cl. .............. 585/469; 568/319; 558/120; 558/357

(58) Field of Classification Search ............. 585/469; 558/120, 357; 568/319
See application file for complete search history.

(56) References Cited

U.S. PATENT DOCUMENTS 4,506,030 A 3/1985 Jones .................. 502/155

6,426,313 B2 7/2002 Walzer, Jr. et al. ......... 502/103

OTHER PUBLICATIONS

David Bradley; "*Shy Chemicals Offer a Solution*" SCIENCE vol. 300, Jun. 27, 2003; pp. 2022-2023.
David E. Bergbreiter; "*Using Soluble Polymers to Recover Catalysts and Ligands*"; Chemical Reviews, vol. 102, No. 10, 2002; pp. 3345-3383.
David J. Cole-Hamilton; "*Homogeneous Catalysis—New Approaches to Catalyst Separation, Recovery, and Recycling*" SCIENCE vol. 299 Mar. 14, 2003; pp. 1702-1706.
David E. Bergbrieter, Phillip L. Osburn, Allan Wilson and Erin M. Sink; "Palladium—Catalyzed C—C Coupling Under Thermomorphic Conditions" J. Am. Chem. Soc., vol. 122, No. 28; 2000; pp. 9058-9064.
David E. Bergbrieter and Chunmei Li; "*Poly(4-tert-bustylstyrene)as a Soluble Polymer Support in Homogeneous Catalysis*" Organic Letters, 2003 vol. 5, No. 14, 2445-47, and supporting materials from http://pubs.acs.org.
David E. Bergbreiter, Phillip L. Osburn, and Jonathan d. Frels; "*Nonpolar Polymers for Metal Sequestration and Ligand and Catalyst Recovery in Thermomorphic Systems*"; J. Am. Chem. Soc. 2001 vol. 123, 11105-06, and supporting materials from http://pubs.acs.org.
David E. Bergbreiter, Reagan Hughes, Jacqueline Besinaiz, Chunmei Li and Phillip L. Osburn; "*Phase-Selective Solubility of Poly(N-alkylacrylamide)s*"; J. Am. Chem. Soc. 2003 vol. 125; 8244-49, and supporting materials http://pubs.acs.org.
David E. Bergbreiter, Phillip L. Osburn, Thomas Smith, Chunmei Li and Jonathon D. Frels; "*Using Soluble Polymers in Latent Biphasic Systems*"; J.Am. Chem.Soc. 2003, vol. 125, pp. 6254-6260.

*Primary Examiner*—Thuan Dinh Dang
(74) *Attorney, Agent, or Firm*—Howrey LLP

(57) ABSTRACT

Phase-selective soluble polymer supports for catalysts are described. The catalysts utilize polystyrene copolymers having enhanced solubility in nonpolar solvents. Other catalysts of the invention utilize polyisobutylene supports. Methods of catalyzing chemical reactions using latent biphasic solvents are also disclosed.

23 Claims, No Drawings

PHASE SELECTIVE POLYMER SUPPORTS FOR CATALYSIS

CROSS REFERENCE TO RELATED APPLICATIONS

The present application is a non-provisional of U.S. Provisional Patent Application Ser. No. 60/408,586, filed Sep. 6, 2002, which is incorporated herein by reference in its entirety.

FIELD OF THE INVENTION

The invention relates to methods and compositions useful for catalyzing chemical reactions. In particular, phase selective polymer supports for catalysts and methods of using these supports to facilitate the recovery of catalysts are disclosed.

BACKGROUND OF THE INVENTION

Polymer supported catalysts are widely used in chemical processes. Much of the technology that is presently available derives from the solid-phase peptide synthesis techniques developed by Merrifield. These techniques are based on insoluble cross-linked polystyrene supports. Catalysts supported on Merrifield resins can be recovered from reaction media using a solid/liquid separation technique such as filtration.

With the growing interest in environmentally friendly, or "green" chemical processes, there is an emphasis on the ability to reuse materials and to minimize amounts of solvents required for a given process. Filtration is typically a relative solvent-intensive process, because the recovered solid is typically rinsed with additional solvent. Further, some polymer supported catalysts suffer from decreased activity once they are isolated via filtration. This impacts their potential to be reused multiple times.

Soluble polymer supported catalysts have been developed. These catalysts can be recovered from the reaction medium either by precipitation followed by filtration, by liquid/liquid separation, or by ultrafiltration using a filtration membrane. Precipitation/filtration obviously suffers from the same drawbacks associated with the filtration of insoluble polymer supported catalysts, described above. Inadequate partitioning of the catalyst into the desired liquid phase often impairs liquid/liquid separations. For example, liquid/liquid separation is impractical if the catalyst and the product are both soluble in the same phase. Ultrafiltration of soluble catalysts using membranes has enjoyed some success, but the recycled catalysts often suffer from some loss of activity.

An alternative way of using a soluble catalyst is to use a biphasic system wherein the catalyst is preferentially soluble in one phase and the substrate and/or products are soluble in the other phase. During reaction, the biphasic solvent system is vigorously mixed to ensure maximum contact between the catalyst and substrate. After reaction, the mixture is allowed to settle and the product phase is removed, leaving the catalyst phase available for recycling. The drawback to biphasic systems is that the presence of multiple phases introduces kinetic barriers to reaction.

The drawbacks associated with biphasic solvent systems can be overcome by using a solvent system that is monophasic under one set of conditions and biphasic under a different set of conditions. For example, liquid-liquid biphasic systems that exhibit an increase in phase miscibility at elevated temperature together with soluble polymer-bound catalysts that have a strong phase preference at ambient temperature are described in "Palladium-Catalyzed C—C Coupling under Thermomorphic Conditions," by Bergbreiter, et al., *J. Am. Chem. Soc.*, 2000, 122, 9058–64 and in "Nonpolar Polymers for Metal Sequestration and Ligand and Catalyst Recovery in Thermomorphic Systems," by Bergbreiter, et al., *J. Am. Chem. Soc.*, 2001, 123, 11105–06.

There is a need in the art for catalytic methods that allow for the efficient separation of the catalyst from the reaction product and the recycling of the catalyst. It is desirable that such methods operate with minimal additional solvent to effect the separation of the catalyst.

SUMMARY OF THE INVENTION

Accordingly, one aspect of the present invention is a method of catalyzing a reaction using a solvent system that is monophasic under one set of conditions and biphasic under a different set of conditions. The chemical reaction will occur when the solvent system is monophasic. At the end of the reaction, the solvent system is switched to the biphasic state. The reaction product is preferentially soluble in one of the phases and the polymer-supported catalyst is preferentially soluble in the other phase. According to one embodiment, the product-containing phase can be removed and replaced by a fresh polar phase and more reactants, allowing the catalyst to be recycled.

A further aspect of the present invention is a catalytically active composition comprising a polystyrene copolymer, the polystyrene copolymer comprising styrene monomers substituted with one or more catalytically active functional groups and pendant styrene groups substituted with one or more functional groups that increase the solubility of the polystyrene copolymer in a non-polar solvent.

A still further aspect of the present invention is a catalytically active composition comprising a catalytically active functional group bound to polyisobutylene.

DETAILED DESCRIPTION OF THE INVENTION

One aspect of the present invention is a method of catalyzing a chemical reaction using a latent biphasic liquid solvent system. As used herein, the term latent biphasic system refers to a mixture of solvents, wherein the mixture is monophasic under one set of conditions and biphasic under a different set of conditions. The liquid solvent components are miscible in the monophasic state. The biphasic state comprises a more polar phase and a less polar phase, with the two phases being layered, one on top of the other. The latent biphasic system facilitates separating the catalyst from the reaction products because the system is designed so that the catalyst is preferentially soluble in one phase of the biphasic mixture and the products are preferentially soluble in the other phase. Typically, the chemical reaction will occur when the solvent system is in the monophasic state. Because the reaction medium is in the monophasic state, the reaction is not impeded by phase transfer phenomena or other kinetic barriers associated with multiple phase reactions. Following the reaction, the solvent mixture is switched to the biphasic state to facilitate separating the products from the catalyst.

According to one embodiment of the invention, the phase containing the catalyst is recycled and used for multiple reaction cycles. For example, if the catalyst is preferentially soluble in the less polar of the phases of the biphasic mixture and the reaction products are preferentially soluble in the more polar of the phases, then a recycling reaction protocol is defined by the following sequence:

1) A substrate and/or reactants are present in the latent biphasic system, along with the catalyst. The reaction proceeds while the latent biphasic system is in the monophasic state.

2) The latent biphasic system is perturbed to switch the system to the biphasic state comprising a more polar phase containing the reaction products and a less polar phase containing the catalyst.

3) The more polar phase containing the reaction products is separated from the less polar phase containing the catalyst.

4) Additional substrate and/or reactants, along with the more polar solvent components are added to the catalyst-containing phase. The solvent system is switched to the monophasic state and the reaction proceeds. The cycle is repeated.

Mixtures of solvents have a spectrum of phase behavior. For example, ethanol and water are miscible in all proportions, as are ethanol and heptane. However, mixtures containing all three of these components vary in miscibility depending on several factors, including the proportions of each of the components, temperature, and the presence or absence of solute. For example, a 10.0:9.5:0.5 (vol:vol:vol) mixture of heptane, ethanol, and water is monophasic at 25° C., but a mixture of the same components with a ratio of 10.0:9.5:1.0 is biphasic at the same temperature. Therefore, heptane, ethanol, and water can be used as components for a latent biphasic system. The monophasic state is a mixture having the composition of about 10.0:9.5:0.5 (vol:vol:vol). Adding an additional 0.5 volumetric equivalents of water perturbs the system and induces phase separation.

Countless latent biphasic systems are possible. For example, a miscible mixture of 10 mL each of toluene and 95% ethanol/water becomes biphasic on addition of 0.5 mL of water. Likewise, a mixture of tert-butylmethylether, ethanol, and water having a volumetric ratio of 10.0:6.0:4.0 is miscible. Adding an additional 2.5 volumetric equivalents of water switches the mixture to a biphasic state. It is within the ability of one of skill in the art to derive other latent biphasic solvent systems without undue experimentation.

Phase separations in many latent biphasic solvents can be initiated by adding a salt to the solvent. If a salt is a side product of the catalytic reaction of interest, then the production of the salt in situ can induce phase separation.

Other examples of latent biphasic systems include mixtures of solvents that are homogeneous within one temperature range and biphasic within a different temperature range. Herein, these systems are referred to as thermomorphic latent biphasic systems. For example, a mixture of equal volumes of heptane and 90% ethanol/water are completely miscible at 70° C. Cooling the mixture to 25° C. produces a biphasic mixture with a less dense non-polar phase containing mostly heptane and a denser polar phase of mostly ethanol and water. Likewise, N,N-dimethylacetamide and heptane are immiscible at 25° C. but are miscible in all proportions above 65° C.

In a separation scheme utilizing latent biphasic mixtures for catalytic reactions, it is desirable that the catalyst selectively partition into one of the two phases of the biphasic state. For example, if the catalyst is preferentially soluble in the non-polar phase, the ratio of the amount of catalyst that ends up in the non-polar phase compared to the amount that ends up in the polar phase is ideally greater than 10:1, more ideally greater than 100:1 and even more ideally greater than 200:1. If the catalyst-containing phase is to be recycled through multiple reaction cycles, it is desirable that the ratio be at least about 200:1.

One aspect of the present invention is a catalytically active composition comprising a polystyrene copolymer. The copolymer comprises styrene monomers substituted with one or more catalytically active functional groups and styrene monomers substituted with one or more lipophilic groups. The copolymers of the present invention can comprise two or more types of monomers. For example, the copolymer can comprise one type of monomer that is catalytically active and one type of monomer that is substituted with a lipophilic group. Alternatively, the copolymer can comprise one type of monomer that is catalytically active and more than one type of monomer that is substituted with a lipophilic group. According to another embodiment, the copolymer can comprise one type of monomer that is catalytically, active, one or more types of monomers substituted with lipophilic groups, and also unsubstituted polystyrene.

As used herein, lipophilic group refers to any functional group that increase the solubility of the polystyrene copolymer in a non-polar solvent. An example class of lipophilic groups, as the term is used herein, is alkyl groups. Alkyl groups that are particularly suitable for imparting solubility include alkyl groups having four to about eighteen carbons. Alkyl groups can be branched, cyclic, or straight chained. A particularly suitable alkyl-substituted styrene is tert-butylstyrene. Examples of suitable alkyl groups include n-butyl, t-butyl, pentyl, hexyl, heptyl, octyl, decyl, dodecyl, tetradecyl, hexadecyl, and octadecyl groups. Other lipophilic groups include aliphatic groups that contain ether linkages, multiple bonds, hydroxy groups, esters, amides, triorganosilyl ethers, and the like. Aliphatic groups can be attached to the styrene monomer through a carbon-carbon bond directly to the styrene or it can be attached via another functional group such as an ether, ester, or amide linkage. Examples include fatty acid derivatives of styrene, having the fatty acid connected to the styrene aromatic ring via an ester linkage. Such fatty acids can be saturated or unsaturated. Examples include lauric, mysristic, palmitic, stearic, arachidic, oleic, linoleic, linolenic, and arachidonic derivatives of the styrene monomer. Styrene monomers can be substituted at either the ortho-, meta-, or para-, position of the aromatic ring or they can be multiply substituted.

Examples of styrene monomers substituted with one or more catalytically active functional groups can include styrene monomers substituted with any species that catalyzes a particular reaction. The catalytic species can be an organic group. Organic catalysts can be bound directly to the styrene monomer or they can be connected to the styrene monomer via a linking moiety.

A styrene copolymer wherein some of the styrene monomers are substituted with a triorganophosphine can be used to catalyze a Michael addition reaction. Examples of triorganophsphines include trialkylphosphines and triarylphophines. An example of such a copolymer, which contains a triarylphosphine, is shown in Formula 1.

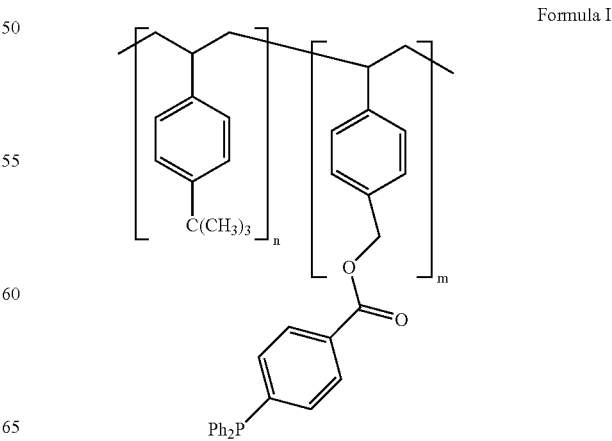

Formula I

An illustrative embodiment utilizing a supported catalyst of Formula I is a Michael reaction between 2-nitropropane and methylacrylate (Reaction 1). The catalyst is dissolved in heptane. An equal volume of an ethanol solution containing the nitropropane and methylacrylate is added and the monophasic mixture is stirred for about 24 hours at about 25° C. About 10%, by volume, of water is then added to induce phase separation. The Michael reaction product is soluble in the polar phase and the catalyst is soluble in the non-polar phase. Adding a fresh ethanol solution of 2-nitropropane and methylacrylate to the non-polar generates a monphasic system and begins a subsequent cycle of the catalytic reaction.

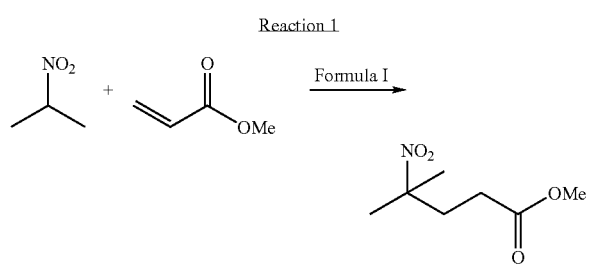

Reaction 1

A polystyrene copolymer wherein some of the styrene monomers are substituted with a nucleophilic moiety can catalyze the acylation of phenols. Examples of such copolymers comprise styrene monomers substituted with heterocyclic nucleophilic groups such as imidazoles, thiazoles, substituted pyridines, and (4-pyridylpiperazine). An example of such a copolymer is shown in Formula II.

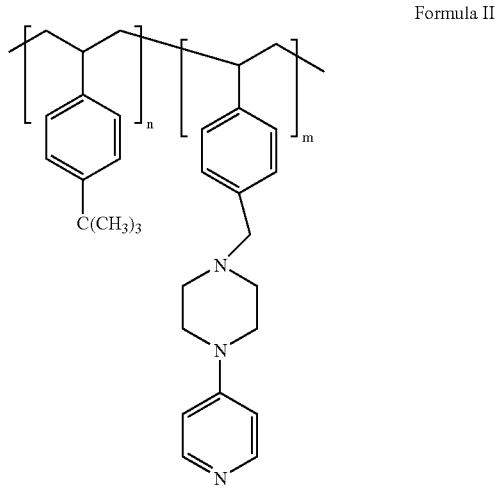

Formula II

Metal complexes are another example of catalytic species. Metal complexes can be incorporated onto styrene copolymers wherein some of the styrene monomers are substituted with appropriate ligand species to form a complex with the metal. For example, a styrene copolymer wherein some of the styrene monomers are substituted with 3,5-bis(phenylthiomethyl)phenyl palladium chloride can be used to catalyze C—C coupling reactions.

Polystyrene, wherein some of the styrene monomers are substituted with adiorganophosphine can support palladium and be used for palladium catalyzed C—C bond formation via Suzuki or Heck coupling. An example of such a diorganophosphine is diadamantylphosphine. In a typical example, about 0.1 to about 2 mol % of a palladium(0) source is added to an excess of the poly(tert-butylstyrene)-supported phosphine ligand in heptane. Addition of a substrate iodoarene and an acceptor (e.g. a arylboronic acid for Suzuki chemistry or a α,β-unsaturated carbonyl compound for Heck chemistry) in a second solvent (e.g. N,N-dimethylacetamide, N,N-dimethylformamide or ethanol) followed by heating leads to C—C bond formation in a Suzuki or Heck coupling. Cooling (or addition of water or salt) produces a biphasic mixture, allowing the nonpolar catalyst-containing phase to be separated from the polar product-containing phase and reused in subsequent reaction cycles.

Copolymers of the present invention can further comprise styrene monomers substituted with one or more functional groups that aid in the quantification of the amount of the copolymer that resides in a particular phase. Examples of such functional groups are dyes, fluorescent probes, and other functional groups containing chromophores. Absorbance, fluorescence spectroscopy, or visible inspection can be used to determine the partitioning of such copolymers in a particular phase.

Copolymers of the present invention can be prepared by copolymerizing the component styrene monomers, that is, copolymerizing the catalytically active substituted styrene monomers with the substituted styrene monomer having enhanced solubility. Many techniques for copolymerizing styrene are known in the art. An example of a particularly suitable technique is polymerization in toluene, using benzoyl peroxide as an initiator. The two monomers are added to a solution of toluene, along with benzoyl peroxide, and the mixture is heated. The reaction can be heated for a length of time of a few hours to a few days. It is typically desirable that the reaction be carried out in an inert atmosphere, for example nitrogen or helium. The ratio of the two monomers can vary, depending on the desired ratio of the monomers in the resulting copolymer. In general, the ratio of the monomers in the resulting copolymer will be approximately the same as the ratio of the monomers in the polymerization reaction. The amount of benzoyl peroxide initiator is typically 0.5 mol % to about 10 mol %, based on the monomers. Benzoyl peroxide-initiated polymerization is well known in the art and it is within the ability of one of skill in the art to optimize a copolymerization based on one's particular target copolymer.

A copolymer of Formula II can be synthesized by adding tert-butylstyrene, 1-(4-vinylbenzyl)-4-pyridylpiperazine, and benzoyl peroxide to toluene at a molar ratio of about n:m:0.01 n. The toluene mixture is heated at about 70° C. for about 24 hours, preferably under an inert atmosphere such as nitrogen. Adding a polar liquid, such as methanol, precipitates the resulting copolymer.

An alternative method of producing copolymers of the present invention is to copolymerize monomers that are substituted with a reactive group, which can subsequently be transformed into the desired substituent by performing a reaction on the copolymer. For example, a copolymer according to Formula I can be prepared by copolymerizing tert-butylstyrene with a phosphine oxide substituted styrene derivative to yield a copolymer containing tert-butylstyrene monomers and phosphine oxide substituted monomers. This copolymer is then reduced by reaction with trichlorosilane and triethylamine to produce the catalytically active triarylphosphine-substituted copolymer.

Another example of a copolymer containing a reactive precursor group is a copolymer of tert-butylstyrene as the solubility-enhanced monomer and chloromethylstyrene as the reactive precursor monomer. Such a copolymer can be reacted with a catalytically active species containing an alkoxide to attach the catalytically active species via an ether linkage. Alternatively, the copolymer can be reacted with a catalytically active species containing a carboxylic group to attach the catalytically species via an ester linkage. It should be apparent to one of skill in the art that these methods can also be used to attach a probe species, such as a dye molecule, to the copolymer.

Poly(4-tert-butylstyrene-c-vinylbenzyl chloride) can also be used as a starting material for a poly(tert-butylstyrene) supported diorganophosphine complex wherein the phosphorous is bonded directly to the styrene aromatic ring. Such poly(tert-butylstyrene) supported diorganophosphine copolymers are described above as supports for palladium catalysts. In a typical example, a diorganophosphine-borane complex is deprotonated and reacted with poly(4-tert-butylstyrene-c-vinylbenzyl chloride). Removal of the borane yields the poly(tert-butylstyrene)-supported diorgaonophosphine.

A further aspect of the present invention is a catalytically active composition comprising a polyisobutylene polymer or oligo-isobutylene that contains a catalytically active species. The catalytically active species can be any of the types of catalysts discussed above. Such modified polyisobutylenes are useful for catalytic reactions in latent biphasic systems because the polyisobutylene is typically preferentially soluble in the less polar phase and can therefore be separated from reaction products that are preferentially soluble in the more polar phase.

Modified polyisobutylenes and oligo-isobutylenes of the present invention can be produced from polyisobutylenes and oligo-isobutylenes that have reactive terminal groups. One example of such oligo-isobutylenes is shown in Formula III.

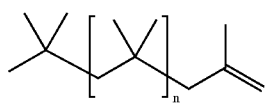

Formula III

Oligo-isobutylenes of Formula III provides a synthetic route to catalytically active species via well known chemical transformations. For example, the terminal alkene can be brominated by reaction with hydrogen bromide, and a catalytically active species containing a hydroxy group can be attached to the resulting bromine terminal polymer via a Williamson ether synthesis.

Oligo-isobutylenes of Formula III can be used as a starting material for a supported triorganophosphine ligand, which can in turn be used as a support for a palladium catalyst. For example the terminal vinyl group can be oxidized to a hydroxy group via an oxidation such as hydroboration-oxidation. The resulting oligomer can then converted into a —CH$_2$OSO$_2$CH$_3$ terminated oligomer using CH$_3$SO$_2$Cl and triethylamine. This mesylate can then be either converted into a —CH$_2$Br-terminated oligomer using NaBr or into a —CH$_2$CO$_2$H-terminated oligomer using a malonic ester synthesis prior to formation of a phosphine ligand or catalyst. In the case of —CH$_2$CO$_2$H, a phosphine can be attached to the oligomer by amide formation using EtO$_2$CCl and N-methylmorpholine to activate the —CO$_2$H, followed by addition of a diorganophosphine-organoamine such as diphenylphosphine-propylamine (DPPA). In the case of the —CH$_2$Br terminated oligomer, a phosphine can be attached by C—P bond formation using lithiated diorganophosphine-borane. The resulting triorganophosphine-substituted oligomer can be mixed with a palladium(0) source such as Pd$_2$(bda)$_3$, to yield a supported palladium catalyst.

EXAMPLES

Example 1

Unless otherwise noted, the general preparatory procedures described in this example were used for all of the examples. 4-tert-Butylstyrene was distilled before use. Benzoyl peroxide was recrystallized from CHCl$_3$/methanol. Toluene was distilled under nitrogen. Gas chromatographic analyses was performed on a Shimadzu instrument equipped with a 15-m SPB (poly(5%-diphenyl-95% dimethylsiloxane) normal phase fused-silica capillary column (0.53 ID). $^1$H NMR spectra were recorded on Varian VXR-300 or Unity p300 spectrometers at 300 MHz. Chemical shifts were reported in ppm with CHCl3 (7.27 ppm) as the internal standard. $^{13}$C NMR spectra were recorded at 75 MHz with CDCl$_3$ (77.23 ppm) as the internal reference. Chemical shifts of $^{31}$P NMR spectra were reported in ppm with H$_3$PO$_4$ (0 ppm) as the internal standard. Gel permeation chromatography was performed using a Ranin SD-200 HPLC system equipped with Dynamax UV-C detector (at 254 nm). A TOSOH BIOSEP column (μm) was used. THF was used as the eluent.

Dye-labeled tert-butylstyrene copolymer. A copolymer containing tert-butylstyrene monomers and dye-labeled styrene monomers was produced to probe the phase selectivity (poly)tert-butylstyrene. METHYL RED was the dye. Dye-substituted styrene monomer was prepared by dissolving 1.4 mL of 4-vinylbenzylchloride and 1.346 g of METHYL RED in 5 mL of distilled dimethylformamide (DMF) in the presence of 1.05 mL of triethylamine. The solution was stirred for 24 h and then poured into 50 mL of water. The resulting solid precipitate was isolated by filtration and purified by column chromatography using 4:1 (vol:vol) hexane:ethyl acetate as the eluent. The product was isolated in 94% yield. $^1$H NMR (CDCl$_3$): δ 8.2 (d, 8.8 Hz, 2H), 7.9 (dd, J=8.8, 9.3 Hz, 4H), 7.4 (s, 4H), 6.8 (d, 9.3 Hz, 2H), 6.7 (dd, J=11.0, 17.6 Hz, 1H), 5.8 (d, 17.6 Hz, 1H), 5.4 (s, 2H), 5.3 (d, 11.0 Hz, 1H), 3.1 (s, 6H). $^{13}$C NMR: δ 166.4, 156.3, 153.1, 143.9, 137.8, 136.6, 135.7, 130.9, 130.2, 128.7, 126.6, 125.7, 122.2, 114.6, 111.7, 66.8, 40.5. MS (ESI): 386 (M+Ht, calcd 386.454. found 386.185.

Dye-labeled poly(4-tert-butylstyrene)was prepared by dissolving 1 mL of 4-tert-butylstyrene, 10 mg of dye-substituted styrene, and 12 mg of benzoyl peroxide in 10 mL of toluene under nitrogen. The solution was heated at 70° C. for 24 hours, cooled to room temperature, and added dropwise to 50 mL of methanol to precipitate the polymer. $^1$H NMR: δ 7.2–6.1 (br, m, 4H), 2.0–1.4 (br, m, 3H), 1.2 (bs, 9H). UV: 427 in heptane.

The copolymer was characterized by GPC and was found to have an M$_n$ of 23,000 Da and an M$_w$ of 48,000 Da. It was readily soluble in heptane. The dye-labeled copolymer was phase selectively soluble in heptane when another polar phase was present. Specifically, when the copolymer was first dissolved in heptane and then mixed with an equal volume of either DMF or 90% aqueous ethanol, a biphasic mixture formed with a hellow heptane phase. Heating either of the biphasic solutions to 70° C. produced a monophasic mixture. Cooling these thermomorphic mixtures back to room temperature reformed the biphasic solution. UV-visible spectroscopic analysis of the non-polar and polar phases showed no detectable dye in the non-polar phase.

The dye-labeled copolymer was dissolved in a miscible mixture (1:1, vol:vol) of heptane and ethanol. Addition of 10 vol. % of water produced a biphasic mixture. The dye-labeled copolymer was exclusively soluble in the less polar heptane-rich phase of the biphasic mixture.

Example 2

Poly(4-tert-butylstyrene)-co-poly(4-vinlybenzylchloride). A mixture of 18.3 mL of 4-tert-butylstyrene, 1.4 mL of 4-vinylbenzyl chloride and 240 mg of benzoyl peroxide were dissolved in 100 mL of toluene under nitrogen, and the solution was heated at 70° C. for 24 hours. After cooling to room temperature, the solution was added dropwise to 500 mL of methanol to precipitate the product polymer. The product polymer was characterized by $^1$H NMR spectroscopy (CDCl$_3$) δ 7.2–6.1 (br, m, 44H), 4.6–4.4 (br, s, 2H), 2.0–1.4 (br, m, 33H), 1.2 (br, s, 90H).

Example 3

Dye-labeled poly(4-tert-butylstyrene) supported phosphine catalyst for Michael addition. Phosphine oxide substituted styrene was prepared by dissolving 4.9 g of 4-diphenylphosphinobenzoic acid and 6 mL of dicyclohexylamine 20 mL of DMF and heating the solution to 70° C. for 20 minutes. At that point, 2.25 mL of 4-vinylbenzyl chloride was added, followed by a small amount of NaI. The mixture so formed was heated overnight. After filtration to remove the solid that formed, the DMF solution of the product was poured into water and extracted with dichloromethane. A crude product was obtained after removal of the CH$_2$C$_2$ under reduced pressure. This crude product was passed through silica gel, using 1:1 hexanes:ethyl acetate as the eluent. Removal of the solvent yielded the product in 63% yield. $^1$H NMR: δ 8.2 (d, 5.9 Hz, 2H), 7.8–7.4 (m, 16H), 6.7 (dd, J=10.7, 17.5 Hz, 1H), 5.8 (d, 17.5 Hz, 1H), 5.4 (s, 2H), 5.2 (d, 10.7 Hz, 1H). $^{13}$C NMR: δ 165.8, 136.5, 136.3, 133.4, 132.5, 132.4, 132.3, 132.2, 131.6, 129.8, 129.7, 128.9, 128.8, 126.7, 114.7,67.1. $^{31}$P NMR (CDCl$_3$): 029.0. MS(ESI): 439 (M+H)$^+$, calcd 439.434. found 439.143.

Dye-labeled poly(4-tert-butylstyrene) supported phosphine oxide was prepared by mixing of 5 mL of 4-tert-butylstyrene, 600 mg of the phoshpine oxide substituted styrene, 5.3 mg of dye substituted styrene and 63 mg of benzoyl peroxide in 50 mL of toluene under nitrogen, then heating at 70° C. for 24 hours. The solution was then cooled to room temperature, and added dropwise into 300 mL of methanol. After filtration, the solid was dried under vacuum. $^1$H NMR: δ 8.1–7.4 (m, 10H), 7.1–6.0 (m, 88H), 4.8 (bs, 2H), 2.2–1.4 (m, 63H), 1.2 (bs, 180H). $^{31}$P NMR (CDCl$_3$): δ 29.1. UV: 430 nm in heptane.

The active catalyst was prepared by preparing a toluene solution (10 mL) containing 1 g of the polymer-supported phosphine oxide under nitrogen. Then, 0.14 mL of trichlorosilane and 0.21 mL of triethylamine were added and the solution was heated at reflux overnight. The product solution was then cooled down to room temperature and poured into 100 mL of methanol. After filtration, the solid was dried under vacuum. $^1$H NMR: δ 8.1–7.4 (m, 10H), 7.2–6.0 (m, 88H), 5.0 (bs, 2H), 2.4–1.5 (m, 63H), 1.2 (bs, 180H). $^{13}$C NMR: δ 165.8, 138.3, 137.9, 137.5, 136.4, 135.2, 132.5, 132.4, 132.3, 132.2, 129.7, 128.9, 128.8, 126.7, 114.7, 67.2. $^{31}$P NMR (CDCl$_3$): δ −4.7. UV: 430 nm in heptane.

Michael addition was performed in a latent biphasic solution. A heptane solution of 365 mg of the polymer-supported catalyst was prepared using 10 mL of heptane. Separately, 0.18 mL of 2-nitropropane and 0.09 mL of methylacrylate were dissolved in 10 mL of ethanol. The two solutions were mixed and stirred for 24 hours. Water (1.5 mL) was added to the homogeneous mixture to induce phase separation. UV-visible spectroscopy showed that all of the copolymer was in the nonpolar phase. The ethanol phase was concentrated under vacuum to isolate the product, and the heptane phase was mixed with fresh substrates for the next cycle. The isolated yields of Michael addition product through the first five cycles were 31.5, 56.7, 69.0, 72.5, and 71.1%, respectively. The initially low yield increases with increasing cylcle number because the product has some solubility in heptane. The product in the first cycle only represents the product that partitions into the aqueous ethanol phase. As the cycle number increases, the heptane phase eventually gets saturated with the product and the isolated yield from the ethanol phase increases.

Example 4

Dye-labeled poly(4-tert-butylstyrene)-supported pyridylpiperazine catalyst for the acylation of phenols. 4-Vinylbenzylchloride was passed through neutral alumina to remove any inhibitors. 1-(4-Vinylbenzyl)-4-pyridylpiperazine was prepared by dissolving 4.32 mL of 4-vinylbenzylchloride and 10 g of N-(4-pyridyl)piperazine in 100 mL of methanol. The solution was allowed to reflux overnight. After cooling to room temperature, 20 mL of 6 N HCl was added and the solution was extracted three times with ether. The ether extracts were discarded and 20 g of NaOH in 20 mL of water was added dropwise to the aqueous solution. The resulting precipitate was recovered by filtration and purified by column chromatography using 5% triethylamine in ethyl acetate as the eluent. Removal of the solvent under reduced pressure produced the product in 72.1% yield. $^1$H NMR: δ 8.2 (d, 6.6 Hz, 2H), 7.3 (dd, J=6.4, 6.6 Hz, 4H), 6.7 (dd, J=10.7, 17.6 Hz, 1H), 6.6 (d, 6.4 Hz, 2H), 5.7 (d, 17.6 Hz, 1H), 5.2 (d, 10.7 Hz, 1H), 3.5 (s, 1H), 3.3 (t, 5.2 Hz, 4H), 2.5 (t, 5.1 Hz, 4H). $^{13}$C NMR: δ 155.2, 150.4, 137.6, 136.9, 136.7, 130.0, 126.4, 113.9, 108.5, 62.9, 52.7, 46.1.

Dye-labeled poly(4-tert-butylstyrene)-supported pyridylpiperazine catalyst was prepared by dissolving 6.6. mL of 4-tert-butylstyrene, 1 g of 1-(4-Vinylbenzyl)-4-pyridylpiperazine, 50 mg of dye-substituted styrene, and 87 mg of benzoylperoxide in 50 mL of toluene under nitrogen. The mixture was heated at 70° C. for 24 hours. After cooling to room temperature, the solution was added dropwise to 300 mL of methanol to precipitate the product polymer. $^1$H NMR: δ 8.2 (bs, 2H), 7.2–6.1 (br, m, 86H), 3.2 (bs, 4H), 2.5 (bs, 4H), 2.0–1.4 (br, m, 63H), 1.2 (bs, 180H). UV: 425 nm in heptane.

The copolymer was used to catalyze the formation of a t-butlydicarbonate (t-Boc) derivative of 2,6-dimethylphenol by dissolving 88 mg of the polymer in 4 mL of heptane. Separately, 305 mg of 2,6-dimethylphenol and 57 mg of Boc$_2$O were dissolved in 4 mL of ethanol. The two solutions were mixed and the resulting homogeneous mixture was stirred for 1 hour. Water (0.6 mL) was added to induce phase separation. The catalyst quantitatively partitioned into the heptane-rich phase. The ethanol phase was concentrated under vacuum to isolate the product. Fresh substrates were mixed with the catalyst-containing heptane phase for the next cycle. The yields of the t-Boc derivative for the first five cycles were 34.3, 60.9, 82.2, 94.6, and 99%. The subsequent yields over 20 cycles were essentially quantitative.

Example 5

Poly(4-tert-butylstyrene) supported diadamantylphosphine as a Pd ligand for Pd(0) Catalysis. A poly(4-tert-butylstyrene) supported diadamantyl phosphine-borane complex was produced by reacting diadamantylphosphine-borane with poly(4-tert-butylstyrene-c-vinylbenzyl chloride). Diadamantylphosphine-borane (0.45 g, 1.42 mmol, 2.5 eq) was introduced to a 100-mL flame-dried round bottom flask equipped with a stir bar and septa, and kept under a positive pressure of $N_2$. The solid was dissolved in 30 mL of freshly distilled THF and cooled to −78° C. Deprotonation of the phosphine borane complex was accomplished by the addition of 0.89 mL (1.42 mmol, 2.5 eq) of a 1.6 M n-BuLi solution in hexanes and stirring at −78° C. for 2 hours before warming the mixture to room temperature and stirring for an additional 12 hours. The reaction temperature was brought back to −78° C. and 1.0 g (0.57 mmol, 1 eq) of dry 10:1 poly(4tert-butylstyrene-c-vinylbenzyl chloride) was placed in a flame-dried 25 mL flask and dissolved in 10 mL of freshly distilled THF. The polymeric solution was then transferred by forced siphon into the reaction flask, which was kept at −78° C. for another 2 h before warming to room temperature and stirring for 12 h. The THF was removed under reduced pressure and the polymeric product was dissolved into 100 mL of hexanes. The hexanes solution was washed with 50 mL (×10) of hexanes saturated DMF. The hexane was removed under reduced pressure, the polymer dissolved into 100 mL of diethyl ether and washed with 20 mL (×5) of $H_2O$. The ether layer was dried over $Na_2SO_4$, the ether removed under reduced pressure, and the product dried under vacuum for 12 hours to give poly(4-tert-butylstyrene) supported diadamantyl phosphine-borane complex in 89% yield. $^1$H NMR: ($CDCl_3$) δ 6.1–7.2 (br, m, 45H), δ 2.9–3.1 (br, s, 2H), δ 1.0–2.2 (br, m, 156H). $^{31}$P NMR: (benzene) δ 36.42 (br, s).

Poly(4-tert-butylstyrene) supported diadamantylphosphine-borane complex (1.03 g, 0.51 mmol) was transferred to a 40 mL reaction tube containing 15 mL of morpholine and sealed with a septa. The reaction mixture was degassed and the sealed system was heated to 110° C. for 36 hours. After cooling to 40° C., the morpholine was removed under reduced pressure. 15 mL of degassed hexanes was then transferred to the reaction tube via forced siphon and the polymer completely dissolved prior to the addition of 15 mL degassed 90% ethanol. The mixture was stirred to ensure extraction of the morpholine-borane complex into the 90% ethanol phase and the phase subsequently removed by forced siphon. The 90% ethanol extraction was repeated and the hexane layer was then transferred by forced siphon to a degassed flask containing $Na_2SO_4$ and allowed to dry. The dried hexane phase was then transferred by forced siphon into an empty, preweighed, degassed flask and the hexanes removed by reduced pressure. The product was then dried in vacuo for 12 h to give poly(4-tert-butylstyrene) supported diadamantyl phosphine in 90% yield and 9% oxidation. $^1$H NMR: (benzene) δ 6.4–7.5 (br, m, 51H), δ 2.7–3.0 (br, s, 2H), δ 1.1–2.6 (br, m, 173). $^{31}$P NMR: (benzene) δ 46.15 (br, s, 9P), δ 29.30 (br, s, 91P).

The poly(tert-butylstyrene)-bound —$CH_2PAd_2]_2Pd(0)$ catalyst was prepared using $Pd_2(bda)_3$ as the Pd(0) source. The catalyst was used to catalyze the conversion of iodobenzene and tert-butylacrylate to tert-butylcinnamate in a mixture of N,N-dimethylacetamide and heptane at 120° C. over 12 h using triethylamine as a stoichiometric base. Cooling this mixture produced a biphasic solution (due to the presence of byproduct triethylammonium iodide salt). The catalyst-containing heptane rich phase was isolated and recycled by adding it to a fresh solution of substrates.

Example 6

Polyisobutylene supported Palladium Catalyst. A vinyl terminated polyisobutylene oligomer ($M_w$ of 1000 or 2000) (e.g. 50 g (50 mmol) of $PIB_{1000}$) was converted into 52 g of —$CH_2OH$-terminated oligomer using hydroboration oxidation with $BH_3SMe$ and basic 30% aqueous $H_2O_2$. This oligomer was then converted into 54.5 g of a —$CH_2OSO_2CH_3$ terminated oligomer using $CH_3SO_2Cl$ and $Et_3N$ in $CH_2Cl_2$. This polyisobutyl (PIB) mesylate was then converted into a —$CH_2CO_2H$-terminated oligomer using a malonic ester synthesis. A phosphine was attached to the oligomer by amide formation using $EtO_2CCl$ and N-methylmorpholine to activate the —$CO_2H$ group prior to addition of diphenylphos-phinepropylamine (DPPA). The product alkyldiarylphosphine was prepared on a 2 g scale and was characterized by NMR spectrosocopy: $^1$H NMR (300 MHz, $CDCl_3$, δ): 0.81–1.65 (m), 2.00–2.12 (m), 3.28–3.35 (m), 7.29–7.40 (m); $^{31}$P NMR ($CDCl_3$, δ): −15.83.

An alternative route to the alkyldiarylphosphine was to convert the polyisobutyl mesylate (PIB—$CH_2OSO_2CH_3$) into a —$CH_2Br$-terminated oligomer using NaBr. A phosphine was attached to the PIB—$CH_2Br$ oligomer by C—P bond formation using lithiated dicyclopentyl phosphine-borane in THF. The 1.8 g of product had $^1$H NMR (300 MHz, $CDCl_3$, δ): 0.81–1.39 (m), 1.52–1.68 (m), 1.82–1.87 (m), 1.94–2.05 (m) and $^{31}$P NMR ($CDCl_3$, δ): 25.98. The same procedure also afforded a diadamantylphosphine-borane terminated PIB oligomer using lithiated diadamantylphosphine-borane as the nucleophile. Removal of the $BH_3$-protecting group was effected by addition of a secondary amine. The free phosphine so formed was characterized by $^{31}$P NMR spectroscopy (e.g. the dicyclopentylphosphine terminated oligomer had a $^{31}$P NMR peak at −11.06δ ($C_6D_6$).

Pd(0) PIB phosphine ligated catalysts were prepared by PIB-triorganophosphine with a Pd(0) source. A solution of 9.15 mg of $Pd_2(bda)_3$ (0.01 mmol) in 10 mL of THF was added to a solution of PIB—$CH_2CONH(CH_2)_3PPh_2(6)$(0.08 mmol) in 2 mL of heptane. The Pd(0) catalyst so formed was then used in catalytic reactions. For example, 10 mL of this solution were added to 10 mL of a 90% ethanol solution containing iodobenzene, phenylacetylene, triethylamine and CuI. Heating the resulting biphasic system to 75° C. led to miscibilization and conversion of the haloarene to an arylalkyne. After reaction, cooling induced phase separation. The product diphenylacetylene in this example was isolated from the lower phase. The upper phase was recycled using a fresh 90% ethanol solution of the other reactants.

What is claimed is:

1. A method of catalyzing a chemical reaction, the method comprising:
   providing one or more substrates and a catalyst in a latent biphasic solvent that is switchable between a monophasic state and biphasic state, the biphasic state comprising a more polar phase and a less polar phase, wherein the products of the catalytic reaction are preferentially soluble in the more polar phase and the catalyst is preferentially soluble in the less polar phase;
   allowing the catalytic reaction to proceed while the latent biphasic solvent is monophasic;

inducing the latent biphasic solvent to become biphasic; and separating the more polar phase from the less polar phase; wherein the catalyst comprises a polystyrene copolymer, the polystyrene copolymer comprising a first styrene monomer and a second styrene monomer, wherein the first styrene monomer is substituted with one or more catalytically active functional groups and the second styrene monomer is substituted with one or more lipophilic groups.

2. The method of claim 1, wherein the second styrene monomer is substituted with a functional group selected from the group consisting of hydrocarbons, hydrocarbons substituted with one or more ester groups, hydrocarbons containing one or more ether groups, and hydrocarbons containing one or more amine groups, amides and triorganosilyl ethers.

3. The method of claim 1, wherein the second styrene monomer is tert-butylstyrene.

4. The method of claim 1, wherein the latent biphasic solvent comprises one or more solvents selected from the group consisting of alkanes having five to twelve carbon atoms, N,N-dimethylacetamide, alcohols having two to four carbon atoms, ethers having four to eight carbon atoms, toluene, and mixtures thereof.

5. The method of claim 1, wherein the latent biphasic solvent comprises heptane and ethanol.

6. The method of claim 1, wherein the latent biphasic solvent comprises about heptane, ethanol, and water, wherein the monophasic state has a heptane:ethanol:water ratio of about 10.0:9.5:0.5 (vol:vol:vol) and wherein the biphasic state has a heptane:ethanol:water ratio of about 10.0:9.5:1.0 (vol:vol:vol).

7. The method of claim 1, wherein the latent biphasic solvent comprises toluene, ethanol, and water.

8. The method of claim 1, wherein the latent biphasic solvent comprises N,N-dimethylacetamide and heptane.

9. The method of claim 1, wherein the inducing step comprises cooling the latent biphasic solvent.

10. The method of claim 1, wherein the inducing step comprises adding water to the latent biphasic solvent.

11. The method of claim 1, wherein the inducing step comprises adding salt to the latent biphasic solvent.

12. A method of catalyzing a chemical reaction, the method comprising:

providing one or more substrates and a catalyst in a latent biphasic solvent that is switchable between a monophasic state and biphasic state, the biphasic state comprising a more polar phase and a less polar phase, wherein the products of the catalytic reaction are preferentially soluble in the more polar phase and the catalyst is preferentially soluble in the less polar phase;

allowing the catalytic reaction to proceed while the latent biphasic solvent is monophasic;

inducing the latent biphasic solvent to become biphasic; and separating the more polar phase from the less polar phase; wherein the catalyst comprises catalytically active functional group bound to polyisobutylene.

13. The method of claim 12, wherein the catalytically active functional group comprises a triorganophosphine ligand.

14. The composition of claim 12, wherein the catalytically active functional group comprises an alkyldiarylphosphine ligand.

15. The composition of claim 12, wherein the catalytically active functional group comprises a triorganophosphine ligand complexed with palladium.

16. The method of claim 12, wherein the latent biphasic solvent comprises one or more solvents selected from the group consisting of alkanes having five to twelve carbon atoms, N,N-dimethylacetamide, alcohols having two to four carbon atoms, ethers having four to eight carbon atoms, toluene, and mixtures thereof.

17. The method of claim 12, wherein the latent biphasic solvent comprises heptane and ethanol.

18. The method of claim 12, wherein the latent biphasic solvent comprises about heptane, ethanol, and water, wherein the monophasic state has a heptane:ethanol:water ratio of about 10.0:9.5:0.5 (vol:vol:vol) and wherein the biphasic state has a heptane:ethanol:water ratio of about 10.0:9.5:1.0 (vol:vol:vol).

19. The method of claim 12, wherein the latent biphasic solvent comprises toluene, ethanol, and water.

20. The method of claim 12, wherein the latent biphasic solvent comprises N,N-dimethylacetamide and heptane.

21. The method of claim 12, wherein the inducing step comprises cooling the latent biphasic solvent.

22. The method of claim 12, wherein the inducing step comprises adding water to the latent biphasic solvent.

23. The method of claim 12, wherein the inducing step comprises adding salt to the latent biphasic solvent.

* * * * *